United States Patent [19]

Doup

[11] Patent Number: 4,506,702

[45] Date of Patent: Mar. 26, 1985

[54] ELECTROMECHANICAL IRRIGATION CONTROLLER

[75] Inventor: Leonard W. Doup, Riverside, Calif.

[73] Assignee: The Toro Company, Riverside, Calif.

[21] Appl. No.: 543,953

[22] Filed: Oct. 20, 1983

[51] Int. Cl.³ .............................................. A01G 27/00
[52] U.S. Cl. .................................... 137/624.2; 248/1; 74/479; 239/69
[58] Field of Search ........................ 137/624.18, 624.2; 248/1, 313; 74/479, 480 R; 239/69, 70

[56] References Cited

U.S. PATENT DOCUMENTS

| 2,762,597 | 9/1956 | Jaworski | 248/313 X |
| 3,708,008 | 1/1973 | Tischler | 137/624.2 X |
| 3,780,766 | 12/1973 | Fink | 137/624.2 |

*Primary Examiner*—Alan Cohan
*Attorney, Agent, or Firm*—Poms, Smith, Lande & Rose

[57] ABSTRACT

An electromechanical irrigation controller for use with a plurality of electrically activated valves for automatically regulating time, location, and duration of irrigation. A microcomputer provides a switching means for sequentially activating the valves and determines the dwell time on each valve. The microcomputer is activated by a clock mechanism having hour and day wheels with selector pins for determining the desired times and days of operation. A single activating switch is mechanically connected to the hour and day wheels by levers which are pushed by the selector pins. When a combined hour and day selection occurs, the levers push the activating switch to start the microcomputer. The frame for the controller is designed to minimize the number of parts, skill, and time required for construction. The hour wheel mounting includes a portion for retaining the hour trip lever. The day trip lever and an actuator link between the hour and day levers are held in position by a combination of integrally molded retainers and slots. The activating switch has a preformed hole in one corner which slips over an integrally molded stud and is then rotated under a bracket to a detent which holds the switch in position without further assembly.

13 Claims, 12 Drawing Figures

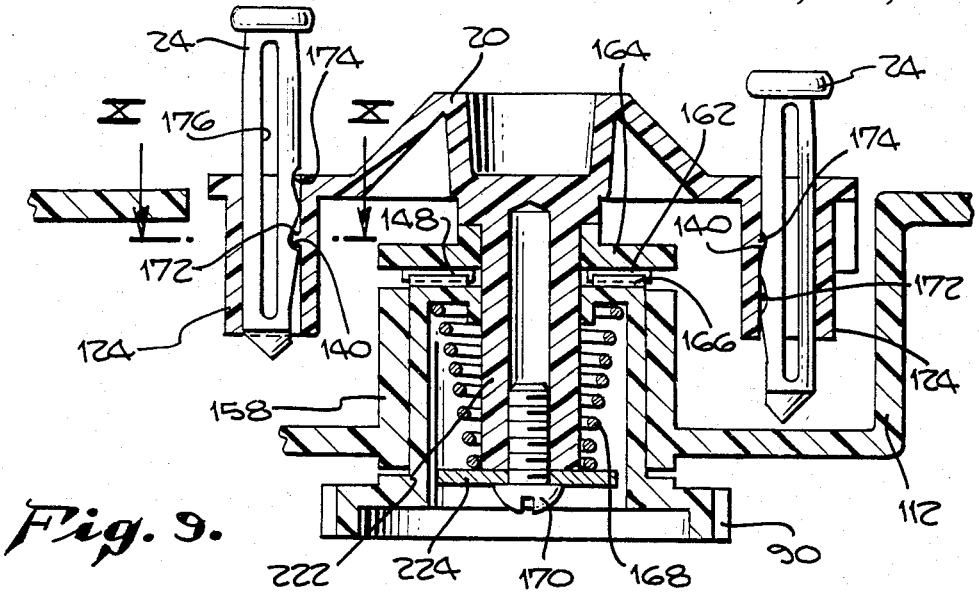
Fig. 9.
Fig. 11.
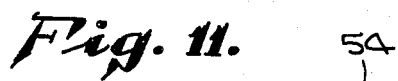
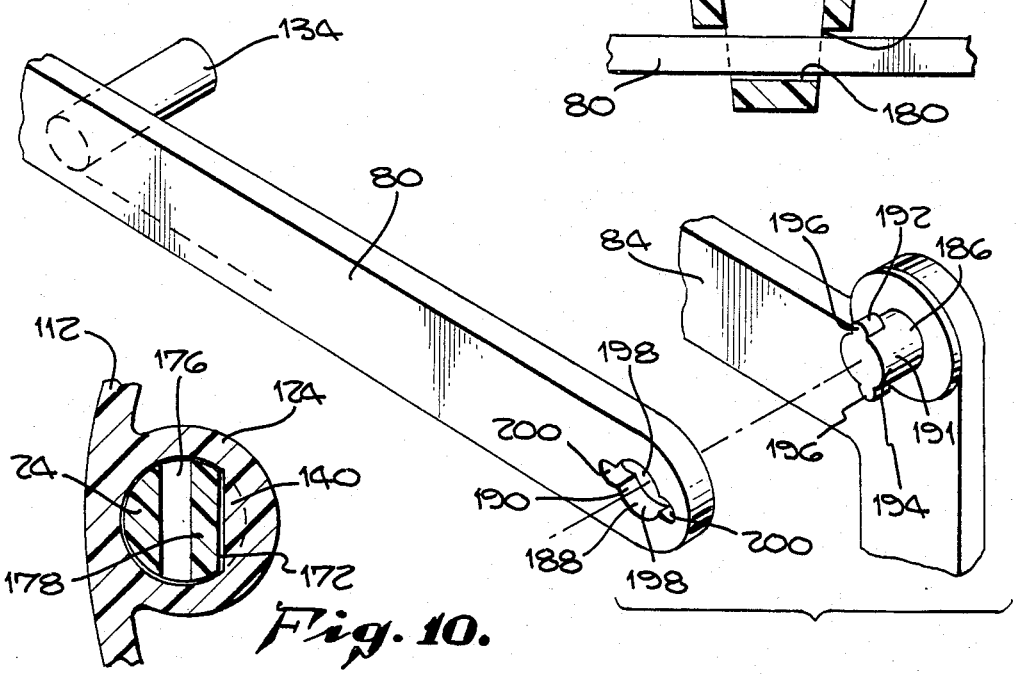
Fig. 10.

ELECTROMECHANICAL IRRIGATION CONTROLLER

BACKGROUND OF THE INVENTION

1. Field of the Invention

This invention relates to watering controllers and more particularly to a controller for use with a plurality of electrically activated valves for automatically regulating the time, location, and duration of lawn, shrub, and drip watering.

2. Description of the Prior Art

Sequential indexing switches for activating multiple stations are well known in the art including U.S. Pat. Nos. 3,040,227; 3,040,228; 3,227,821; 3,224,912; 3,291,922; 3,305,649; and 3,878,345. All of these switches are mechanical rotary units. None of them have means for determining the hour or day on which the indexing should start. Separate clocks have been utilized to automatically start the indexing switches at desired times. An example of such a day and hour clock is U.S. Pat. No. 3,864,539 to Hauser. A day timer disc is located inside a drum type hour timer which is driven by an electric motor. The day timer disc is advanced once a day by an indexing pin. Switch actuators are located in the hour positions on the hour wheel and the day positions on the day wheel. An indexing switch such as those disclosed in the preceding series of patents is activated only when a switch actuator at one location of the hour timer activates an hour switch and switch actuator at one location of the day timer simultaneously activates a day switch to provide an electric circuit to the indexing device.

All the devices described above are mechanically complicated and require numerous parts. Skilled assembly of the devices is required at great expense. The numerous parts increase the possibility of failure of the total device because of the failure of any given part.

SUMMARY OF THE INVENTION

Accordingly, it is an object of the present invention to provide and improved electromechanical irrigation controller for use with a plurality of electrically activated valves.

It is another object of the present invention to provide an irrigation controller having a minimum number of parts.

It is another object of the present invention to provide an irrigation controller that may be assembled at minimum expense.

It is another object of the present invention to provide an irrigation controller that has increased reliability.

It is another object of the present invention to provide an irrigation controller having day and hour wheels with only a single activating switch for controlling the switching means for sequentially activating the valves.

It is another object of the present invention to provide an irrigation controller having a frame which includes portions for holding and positioning the various parts of the controller.

It is yet another object of the present invention to provide a microswitch holder formed integrally with the frame and requiring no fasteners for retaining the microswitch in position.

The above, and other objects of the present invention are achieved, according to the preferred embodiment thereof, by providing a switching means in the form of a microcomputer for sequentially activating the valves having adjustable timing unit means for determining the dwell time of the switching means on each given valve. Six valve stations are provided with an on-off switch for each valve station and a potentiometer for providing variable resistance to the microcomputer according to time scales beside each station knob. The microcomputer dwells on the given station for time periods varying between 5 and 60 minutes. Stations 5 and 6 have additional range switches allowing selection of a 5 to 60 minute range and a 1 hour to 12 hour range.

Thus, if lawn watering is desired, the station knobs are adjusted to cause the microcomputer to dwell on the selected stations for periods of 5 to 60 minutes. If shrub or tree watering is desired requiring longer periods of time, stations 5 and 6 are used with the range selector switches placed in the 1 hour to 12 hour range.

An additional station is provided to control an auxiliary water pump which may be utilized for the purpose of providing adequate water pressure to all of the water systems controlled by the irrigation controller. The pump circuit only operates when one of the electrically activated valves is selected.

A day event station provides a 24 hour period selection totally independent of the microcomputer. This station may be utilized to provide drip watering over 24 hour periods once or twice a week.

The microcomputer controlled switching means goes through a cycle only after being started by an hour timer means selection determining the time of day of activation and simultaneously, a day timer means selection determining the day for activation. A single activating switch is utilized to turn on the switching means. A lever between the activating switch, the hour timer means, and the day timer means combines the selections made on the hour and day timer wheels to push the activating switch into operation. Two and three position pins on the day and hour timer wheels provide the selection means for causing the day and hour trip levers to engage the selection pins. Where the conjunction of selections on the day and hour wheels are simultaneous, the hour wheel pushes the hour trip lever into an operating position, the day wheel pushes the day trip lever into an operating position, and an actuator link between the two presses against the activating switch to cause it to turn on the switching means. The switching means then runs through its cycle providing the selection dwell times on each of the watering stations.

Another improvement of the present invention is the provision of a unitary frame means for minimizing the number of parts, facilitating the assembly of the irrigation controller, and minimizing the possibility of breakdown of the irrigation controller mechanisms. The frame means is a plastic injection molded part having many members and portions specifically designed to replace parts and functions found in previous controllers. Many of the parts are also specially molded in plastic to have portions and members replacing multiple parts and functions found in previous controllers.

An examle of the special designs is a switch mounting member which is an integrally molded part of the frame means having an integrally molded cylindrical mounting stud and a resilient bracket. A standard microswitch having holes in opposite corners is initially installed by inserting the stud into one of the holes. The microswitch is then swung under the bracket until the hole in the opposite corner catches on a detent in the bracket. No further assembly is required to retain the microswitch on the frame means. What previously took two minutes to assemble using screws now takes two seconds.

BRIEF DESCRIPTION OF THE DRAWING

The above and other embodiments of the present invention may be more fully understood from the following detailed description taken together with the accompanying drawing wherein similar reference characters refer to similar elements throughout and in which:

FIG. 9 is a sectional view along line IX—IX of FIG. 8;

FIG. 10 is a sectional view along line X—X of FIG. 9;

FIG. 11 is a sectional view along line IX—XI of FIG. 7; and

FIG. 12 is an enlarged exploded view of the levers in the upper right hand corner of FIG. 4.

DESCRIPTION OF THE PREFERRED EMBODIMENT

Figure 1:
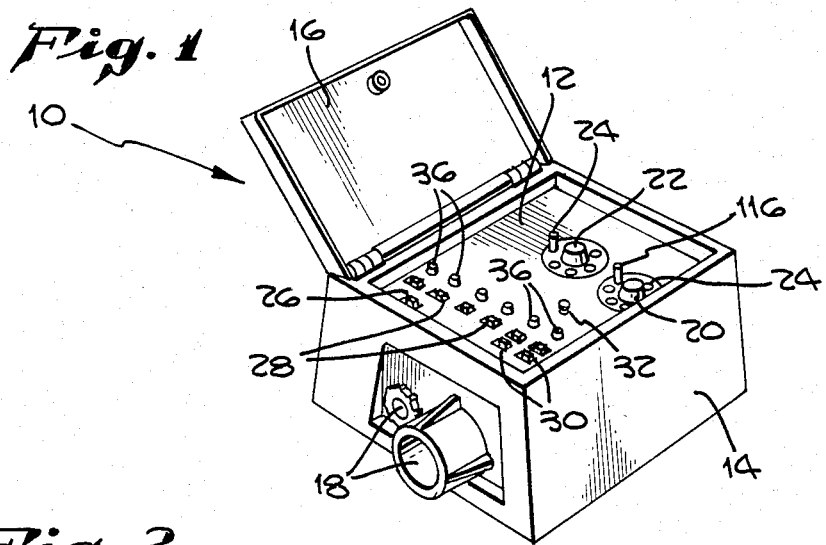
FIG. 1 is a perspective view of an irrigation contoller.

Referring now to the drawing, there is illustrated in FIG. 1 thereof a perspective view of an irrigation controller, generally designated 10. Irrigation controller 10 includes a control panel 12, cabinet 14, door 16 and electrical conduit inlets 18. Control panel 12 has an hour timer means wheel 20 for determining the time of day for activating of the irrigation controller 10. Day timer means wheel 22 determines the day for the activation of irrigation controller 10. Hour wheel 20 operates continuously from an external source of electricity. A plurality of pins 24 are located in a circle about the periphery of both hour wheel 20 and day wheel 22. The selection of pins 24 controls the start of a switching means inside cabinet 14 which may be utilized to sequentially activate six remote electrically controlled irrigation valves. Switch 26 is a master on-off switch for the switching means. The six circuits for controlling remote valves are selectively placed into use by valve on-off switches 28. Any combination of valve switches 28 may be selected. Each of the valve circuits controlled by valve switches 28 may be utilized to allow dwell times on the remote valves to vary between 5 and 60 minutes. Range switches 30 on channels 5 and 6 allow the normal 5 to 60 minute range to be changed to a 1 hour to 12 hours on those channels. Each of the six channels also has an adjustable timing unit 36 which allows the dwell time on any given channel to be varied precisely between 5 and 60 minutes on all six channels and additionally between 1 hour and 12 hours on channels 5 and 6.

Valve switches 28 also have a third position which manually turns on the desired valve station. Manual switch 32 is an altenate method of initiating the action of the switching means through the entire switching sequence without the use of day and hour timer wheels 20 and 22. Activation of manual switch 32 is not required to turn on a desired station by the utilization of the third position of valve switches 28.

Figure 2:
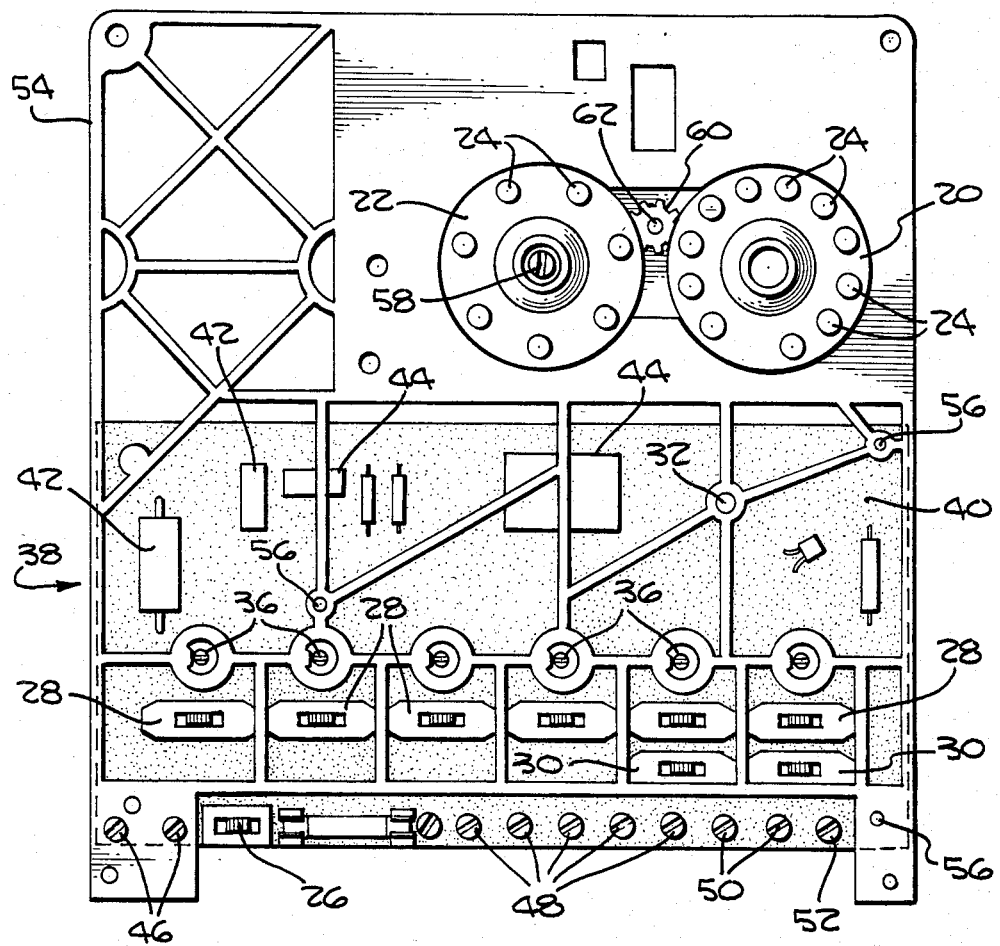
FIG. 2 is a front view of the frame means inserted in the irrigation controller of FIG. 1.

FIG. 2 is a front view of the frame inside cabinet 14 underneath control panel 12 shown in FIG. 1. Hour wheel 20, day wheel 22, pins 24, on-off switch 26, valve on-off switches 28, range switches 30, manual switch 32 and adjustable timing units 36 all are the same as shown in FIG. 1 and protrude through control panel 12. Timing units 36 in FIG. 2 have the knobs shown in FIG. 1 removed. Adjustable timing units 36 are potentiometers, and are part of microcomputer switching means 38. Switching means 38 includes printed circuit board 40, electronic components 42, and microcomputers 44 which are beyond the course and scope of the present invention. Power terminals 46 are connected through a transformer to line power. Output terminals 48 are for the first four stations having dwell times variable between 5 and 60 minutes. Dual range output terminals 50 are for stations 5 and 6 which include both a 5 to 60 minute range and a 1 hour to 12 hour range. Range switches 30 allow selection between the two different ranges. Pump terminal 52 may be utilized to control an external pump if needed to provide adequate pressure for all of the external irrigation circuits. Pump terminal 52 is operative only if at least one value station is also operative.

Frame means 54 is designed to carry all of the components of irrigation controller 10 and allow assembly of these components with a minimum of time and effort. Frame means 54 is injection molded plastic having specially molded members and portions designed to eliminate separate parts and maximize the durability of irrigation controller 10. For example, printed circuit board 40 with all of its components previously mounted thereto is attached to frame means 54 at only three circuit board attachment points 56. Day wheels 20 and 22 sit on specially formed axles in frame means 54 and each are secured thereto by a single screw. Day wheel screw 58 is shown in FIG. 2. The only other separate element shown in FIG. 2 is idler gear 60 between hour wheel 20 and day wheel 22. Idler gear 60 sits on idler gear shaft 62 which is an integrally formed part of frame means 54. Idler gear 60 is held in position by the overhanging edges of day and hour wheels 20 and 22.

Figure 3:
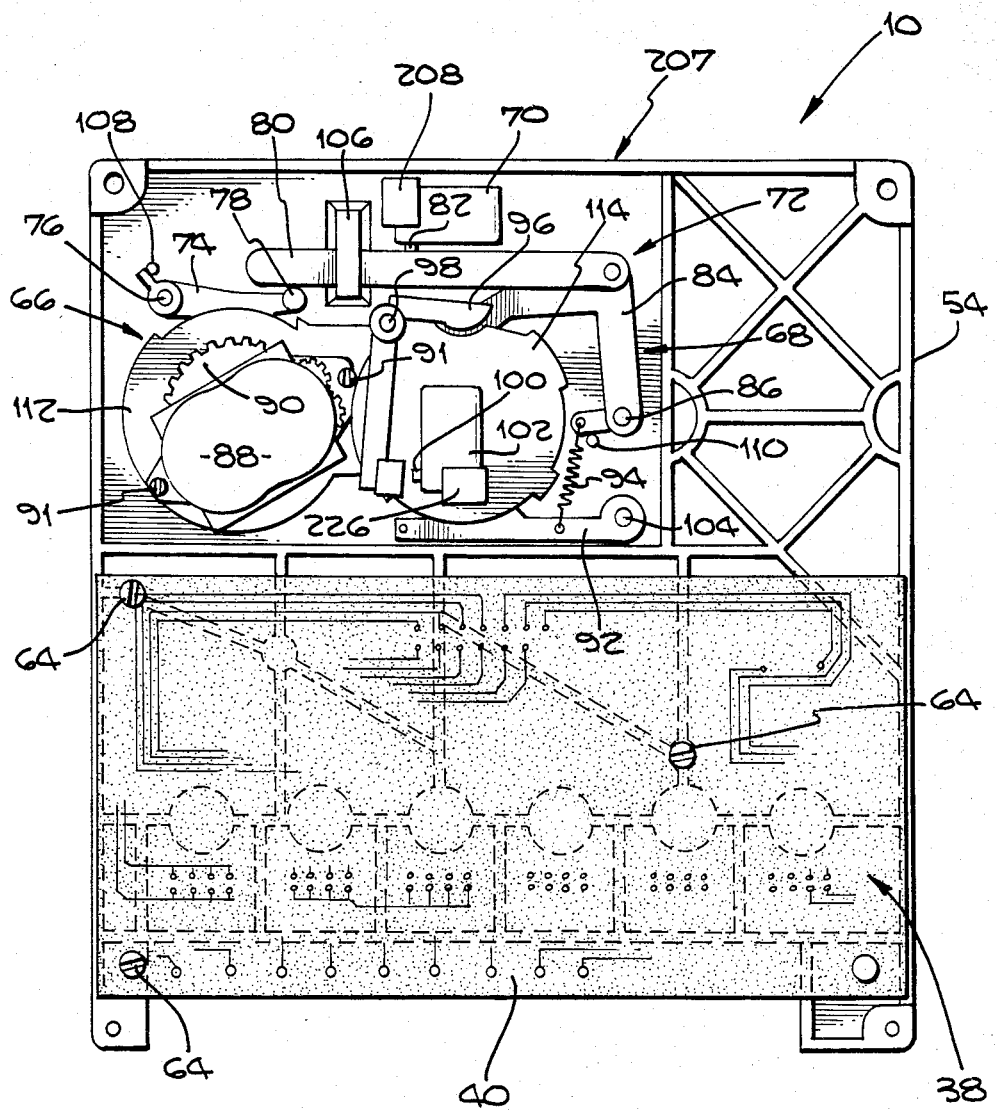
FIG. 3 is a rear view of the frame in FIG. 2.

FIG. 3 is a bottom view of frame means 54 shown in FIG. 2. Printed circuit board 40 is mounted on frame means 54 by three circuit board fasteners 64. The assembly of the remainder of irrigation controller 10 is similarly facilitated by the design of frame means 54 to operate with the component parts of hour timer means 66 and day timer means 68.

Switch 70 is turned on by the combined action of hour timer means 66 determining the time of day and day timer means 68 determining the day. Combining the actions of hour timer means 66 and day timer means 68 is made through lever means 72. Hour trip lever 74 of lever means 72 is initially rotated about hour trip lever axle 76 to move hour trip lever 74 into an operating position by an hour timer means 66 time of day selection. As shown in FIG. 3, hour trip lever 74 is pushed upwards in a counterclockwise direction around hour trip lever axle 76 causing hour trip lever knob 78 to raise actuator link 80. Without further action by day timer means 68, actuator link 80 is not raised high enough against switch button 82 to activate switch 70.

In order to activate switch 70, day trip lever 84 of lever means 72 must be rotated about day trip lever axle 86 in a clockwise direction as shown in FIG. 3 to move day trip lever 84 into a day trip lever operating position by a day timer means 68 day selection. The rotation of day trip lever 84 in a clockwise direction raises actuator link 80 further towards the top of FIG. 3, and when combined with the rotation of hour trip lever 74 previously discussed, pushes button 82 enough to activate switch 70 which then turns on microcomputer switching means 38.

Electrical timing motor 88 operates continuously in the same manner as a clock motor turning drive gear 90 of hour timer means 66. Electrical timing motor 88 is attached to frame means 54 by two motor fasteners 91. Hour timer means 66 advances day timer means 68 once a day and then releases day timer means 68. Positioner lever 92 holds day timer means 68 in position when it is not being advanced by hour timer means 66. Spring 94 biases both positioner lever 92 and day trip lever 84 against day timer means 68.

The day event lever 96 is also operated by day timer means 68. Day event lever 96 is pushed by a selection pin on day timer means 68 causing day event lever 96 to rotate around day event lever axle 98 in a counterclockwise direction in FIG. 3 causing day event lever 96 to push against day event switch button 100 to activate event switch 102. Day event switch 102 may be utilized to control any watering activity requiring an entire 24 hour period of duration.

As noted above in connection with FIG. 2, frame means 54 is specifically designed to reduce the number of parts in controller 10 by incorporating in the molded structure members and portions which would require numerous additional parts in conventionally constructed irrigation controllers. Examples on the back include hour trip lever axle 76, day trip lever axle 86, positioner lever axle 104, actuator link box retainer 106, hour trip lever stop 108, day trip lever 110, hour timer wheel mounting member 112, and day timer wheel mounting member 114.

Figure 4:
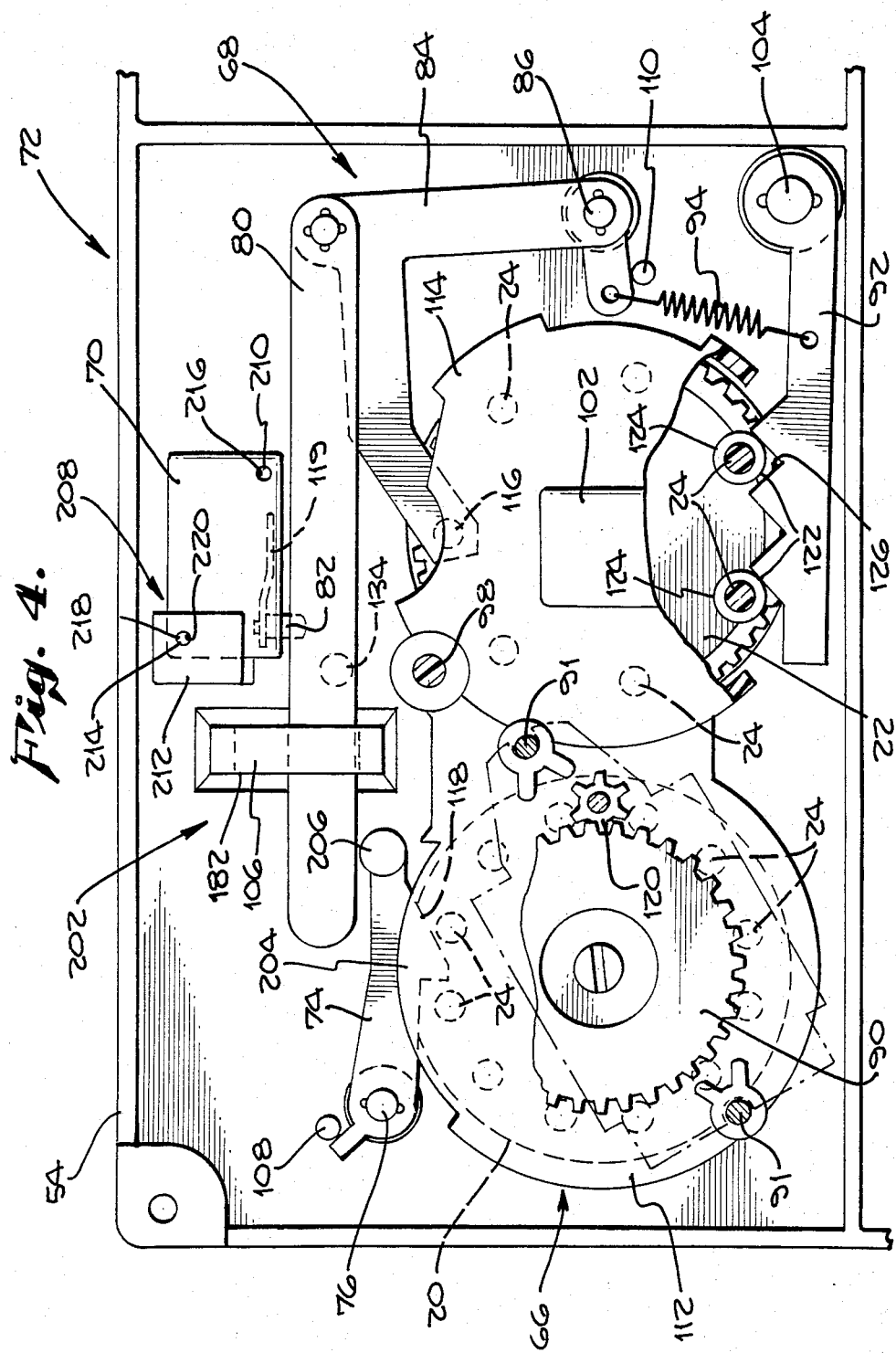
FIG. 4 is an enlarged view of the upper left quadrant of FIG. 3.

FIG. 4 is an enlarged view of the upper half of FIG. 3 with several shadow views of parts shown and cutaways added. Both hour timer means 66 and day timer means 68 are in inoperative positions with respect to switch 70. The bottoms of pins 24 are shown in shadow outline and operate against hour trip lever 74 and day trip lever 84 when selected. Selection of pins 24 is made on the top side of irrigation controller 4 as illustrated in FIG. 1. In FIG. 1, all pins 24 have been pushed to their lowest position in hour timer wheel 20 and day timer wheel 22 except for one pin in each wheel. Pushing of the pins down into hour timer wheel 20 and day timer wheel 22 causes the bottom ends of the pins to encounter hour trip lever 74 and day trip lever 84 as wheels 20 and 22 rotate. As shown in FIG. 4, pin 116 in day timer wheel 22 has not been pushed down and would appear on the top side as the elevated pin 116 in FIG. 1. Day trip lever 84 is, therefore, not pushed in a clockwise direction as discussed in FIG. 3, but instead, is not engaged at all by pin 116. Day trip lever 84 is in a rest position biased against day trip lever stop 110 by spring 94.

Similarly, hour trip lever 74 is also in a rest position against hour trip lever stop 108. As day timer wheel 22 rotates, hour trip lever cam portion 118 rides up on a pin 24 if the pin has been pushed down in day timer wheel 22 forcing hour trip lever 74 to rotate in a counterclockwise direction about hour trip lever axle 76. When day wheel 22 continues rotating, lever cam portion 118 falls off selected pin 24 and hour trip lever 74 is returned to a rest position by switch spring 119 returning button 82 to a rest position. The action of switch spring 119 pushes actuator link 80 against hour trip lever 74 causing hour trip lever 74 to return to the rest position shown biased against day wheel 20.

FIG. 4 also illustrates the relationship between electric timing motor 88, output pinion 120 of electric timing motor 88, and drive gear 90 of hour timer means 66.

In addition, FIG. 4 shows the operation of positioner lever 92. Without positioner lever 92, day timer wheel 22 would be free to rotate between advances by hour timer wheel 20. Positioner lever 92 operates against semicircular ridges on the bottoms of pin receptacles 124 to hold day timer wheel 22 in position until the next advancement by hour timer wheel 20. Besides holding day timer wheel 22 still, positioner lever 92 also keeps day timer wheel 22 in a position to operate day trip lever 84 if a pin 24 is selected and positioned in the same position as pin 116 which, as noted above, is not selected in FIG. 4.

Positioner lever 92 is specifically designed to allow substitution of different day timer wheels 22 having different numbers of days designated. Day timer wheel 22 shown in all the figures of the present invention has seven selector pins corresponding to the seven days of the week. Because of water rationing problems, some govermental jurisdictions have passed ordinances allowing watering only on alternative days or every third day. With a day timer wheel having seven segments, automatic operation on alternate days or every third day is impossible. At best, the desired combinations are selected on the seven day wheel and then the seven day wheel is advanced manually once a week to restart the alternate day or every third day cycle. Substitution of a day wheel having six segments solves the problem of alternate or every third day watering and allows completely automatic operation. If a six segment wheel were substituted in irrigation controller 10 for the seven day timer wheel 22 which is illustrated, irrigation controller 10 can provide alternate or every third day watering.

However, an additional problem is created by the substitution of a six segment wheel for a seven segment wheel in that the gearing between hour timer wheel 20 and day timer wheel 22 remains the same. If only one wheel is utilized, the gearing can be selected to always properly position day timer wheel 22 for operation of day trip lever 84. A day timer wheel having six segments would not be advanced far enough to properly activate day trip lever 84. Positioner lever 92 provides a solution to this problem by causing day timer wheel 22 to advance slightly to put a six segment day timer wheel 22 into position to operate day trip lever 84. Positioner lever 92 has a V-shaped centering notch 126 having an outer opening of the V wider than the diameter of semicircular ridge 122. When day timer wheel 22 is released by hour timer wheel 20 with semicircular ridge 122 at any position along the top of the V of V-shaped centering notch 126, biasing spring 94 causes positioner lever 92 to rotate in a counterclockwise direction around positioner lever axle 104 to cause semicircular ridge 122 to slide down into the bottom of the V of V-shaped centering notch 126. Thus, positioner lever 92 does not require a precise release point of day timer wheel 22 by hour timer wheel 20 in order to hold day timer wheel 22 in a proper position for activation of day trip lever 84. If a six segment wheel is utilized instead of the standard seven segment day timer wheel 22, positioner lever 92 automatically takes the misaligned release of the six day wheel and converts it into a properly aligned rest position for activation of day trip lever 84.

FIG. 4 further illustrates the use of switch mounting member 208 which is an integrally molded part of frame means 54. Switch mounting member 208 comprises a cylindrical mounting stud 210 and a resilient bracket 212 having bracket detent 214. Switch 70 is a standard Microswitch such as those manufactured by Microswitch of Freeport, Illinois. Standard microswitches have third walls 216 defining cylindrical apertures 218 through two of the opposite corners to allow attachment in normal applications by screws.

Switch 70 may be easily and accurately installed on frame means 54 by slipping one of the cylindrical apertures 218 over mounting stud 210 prior to the installation of lever means 72 in frame means 54. Installation of switch 70 on mounting stud 210 is possible when the body of switch 70 is lowered onto mounting stud 210 away from resilient bracket 212. Once switch 70 is seated on mounting stud 210, it may then be rotated in a counterclockwise direction in FIG. 4 using mounting stud 210 as an axle until bracket detent 214 engages activating switch detent stop 220 which is simply the upper portion of cylindrical aperture 218 in the corner of switch 70. No further assembly is required to retain switch 70 to irrigation controller 10. Lever means 72 may then be assembled and installed on frame means 54.

Figure 5:
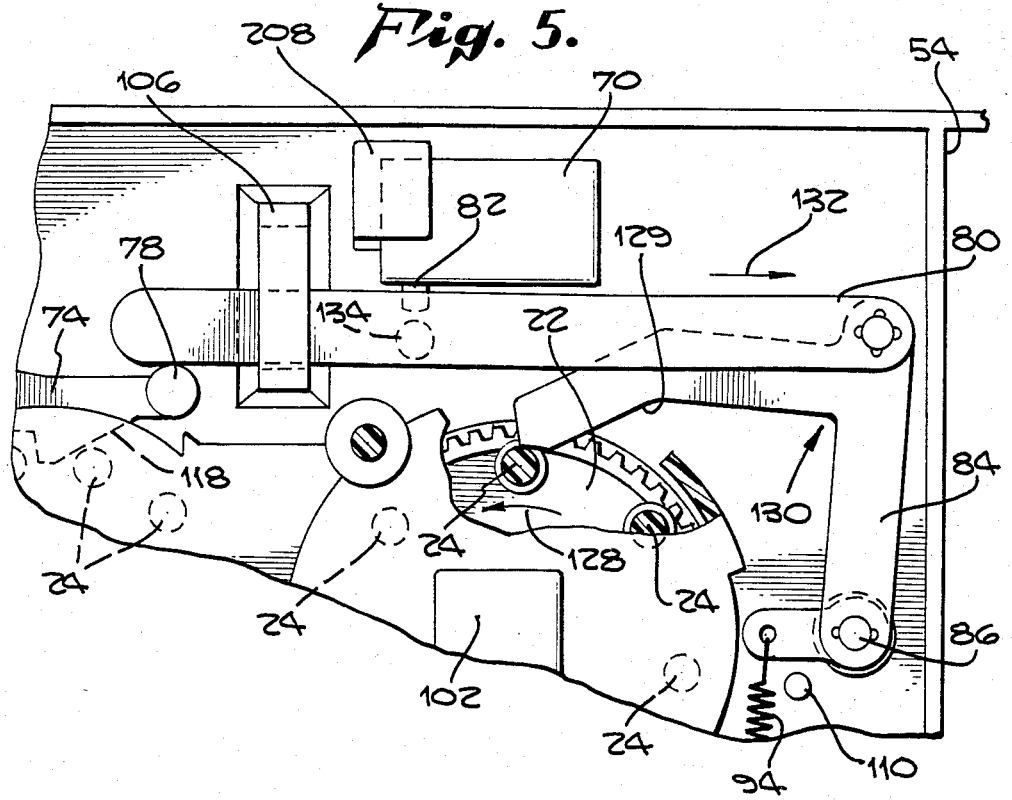
FIG. 5 is cutaway view of the upper right hand portion of FIG. 4.

FIG. 5 is an enlarged view of the upper right corner of FIG. 4 after day timer wheel 22 has been rotated in a counterclockwise direction as indicated by arrow 128. Day trip lever cam portion 129 has ridden up on pin 24 which is in a selected position by having been pushed down into day timer wheel 22 as illustrated in FIG. 1. Day trip lever 84 has been rotated about day trip lever axle 86 in a clockwise direction as indicated by arrow 130. Rotation of day trip lever 84 has caused actuator link 80 to be drawn to the right of FIG. 5 as indicated by arrow 132. Actuator link 80 is now in a position to push button 82 of switch 70 by pressure from actuator link post 134 that is now in alignment with button 82. Switch 70, however, is not activated because hour trip lever 74 remains in the same position as illustrated in FIG. 4 with hour trip lever cam portion 118 located between pins 24.

Figure 6:
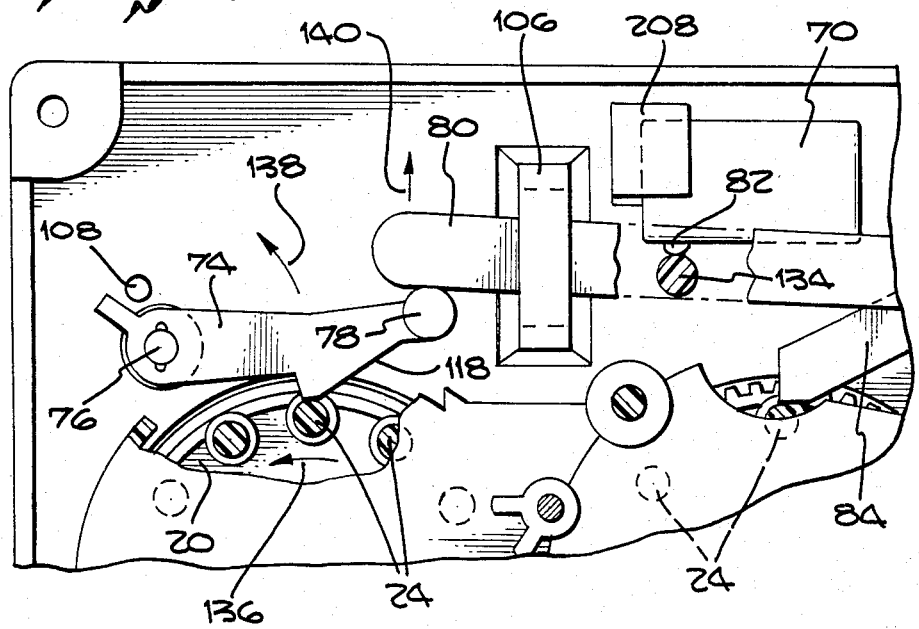
FIG. 6 is a cutaway view of the upper left hand portion of FIG. 4.

FIG. 6 is an enlarged view of the upper left hand corner of FIG. 4 after hour timer wheel 20 has rotated in a counterclockwise direction as shown by arrow 136. Hour trip lever cam portion 118 has ridden up on selected pin 24 forcing hour trip lever 74 in a counterclockwise direction about hour trip lever axle 76 as indicated by arrow 138. As discussed above in conjunction with FIG. 3, hour trip lever knob 78 is thereby forced up against actuator link 80 in the direction of arrow 140. Because actuator link 80 was previously positioned into a day timer means operative position as described in FIG. 5, actuator link post 134 is in alignment with switch button 82 and pushes button 82 to activate switch 70.

Figure 7:
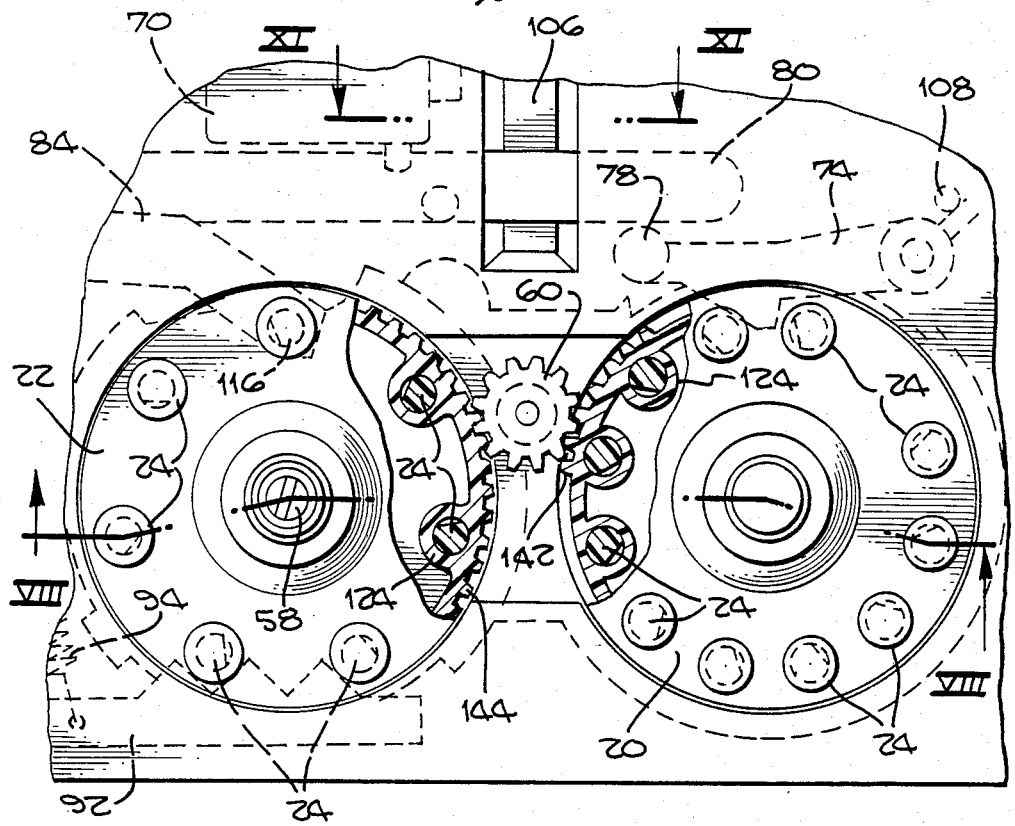
FIG. 7 is an enlarged cutaway view of the upper right hand corner of FIG. 2.

FIG. 7 is an enlarged view of the upper right hand corner of FIG. 2 rotated 180 degrees with cutaways and shadow outlines of underlying structure. Hour timer wheel 20 has pins 24 arranged around the periphery and held in position by pin receptacles 124. Both pins 24 and pin receptacles 124 are cylindrical. As noted above, hour timer wheel 20 rotates continuously by the action of electrical timing motor 88 (FIG. 3). Partial ring gear 142 on the periphery of hour timer wheel 20 engages idler gear 60 once a day to cause the advancement of day timer wheel 22. Day timer wheel 22 has a continuous ring gear 144 in order to operate with idler gear 60 and partial ring gear 142 of hour means wheel 20.

Figure 8:
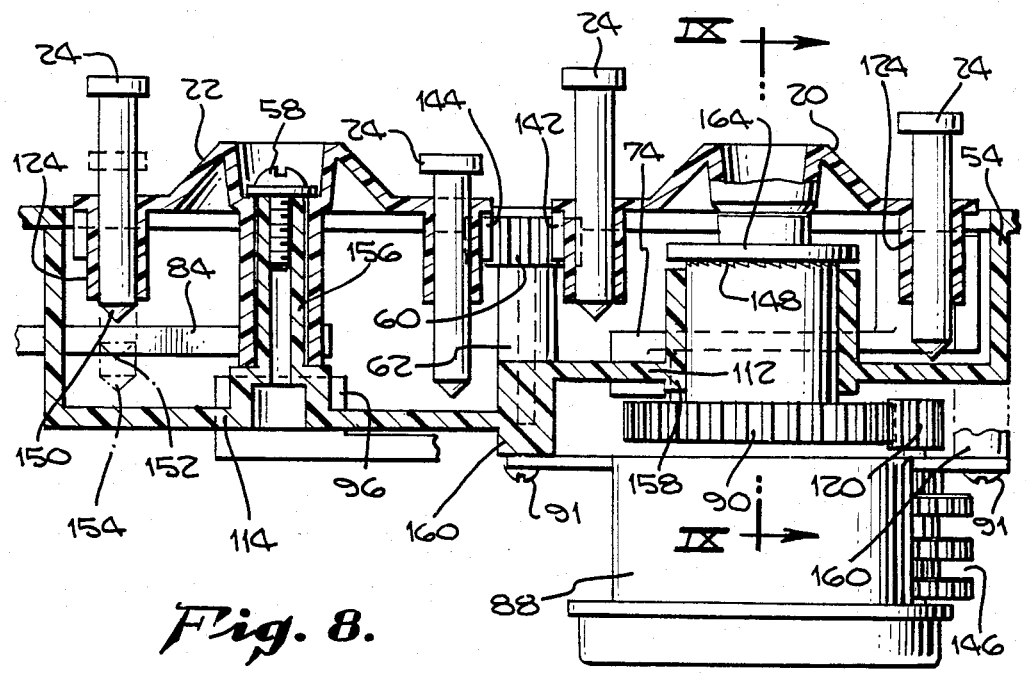
FIG. 8 is a sectional view along line VIII—VIII of FIG. 7.

FIG. 8 is a cross-sectional view of FIG. 7 along the line VIII—VIII of FIG. 7. Electrical timing motor 88 operates continuously in the manner of a clock through gear train 146 and pinion 120 to rotate drive gear 90 of hour timer wheel 20. A ratchet 148 between drive gear 90 and hour timer wheel 20 allows manual setting of hour timer wheel 20 to the proper time in the same manner as the setting of a clock. Hour timer wheel 20 drives idler gear 60 through partial ring gear 142. Idler gear 60 in turn rotates day timer wheel 22.

Operation of irrigation controller 10 is determined by the selection of pins 24 which is achieved by moving pins 24 up and down in hour timer wheel 20 or day timer wheel 22. In hour timer wheel 20, the pins 24 are two position pins wherein they are either on or off with the pin on the left side of hour timer wheel 20 in the upper or off position and the pin 24 on the right side of hour timer wheel 20 in the lower position or on position. As hour timer wheel 20 rotates, the pin 24 on the right side of hour timer wheel 20 eventually touches and activates hour trip lever 74 in a location which is immediately behind the axis of hour timer wheel 20.

Pins 24 on day timer wheel 22, on the other hand, are three position pins which may be adjusted into an upper position, a middle position, and a lower position. Pin 24 on the right side of day timer wheel 22 is in the lowest position. Pin 24 on the left side of day timer wheel 22 is in the upper position. Shadow outlines of the tip of the left pin 24 of day timer wheel 22 are illustrated below upper pin position 150 including middle pin position 152 and lower pin position 154. When the pin on the left side of day timer wheel 22 is in either the middle pin position 152 or the lower pin position 154, day trip lever 84 is moved into an operating position. When pin 24 is in lower pin position 154, pin 24 encounters and activates both day trip lever 84 and day event lever 96.

FIG. 8 also illustrates the integrated nature of frame means 54 with the other structures of irrigation controller 10. Day timer wheel mounting member 114, day wheel post 156, idler gear shaft 62, hour timer wheel mounting member 112, hour timer wheel bearing 158, and electrical timing motor mounting 160 are all integrally formed with frame means 54.

FIG. 9 is a sectional view along line IX—IX of FIG. 8. Ratchet 148 has upper teeth 162 on a washer 164. Lower teeth 166 are formed as an integral part of drive gear 90. Manual movement of hour timer wheel 20 is achieved by movement of upper teeth 162 over lower teeth 166 made possible by compression of spring 168. Drive gear 90 rotates in hour timer wheel bearing 158. Hour timer wheel 20 is secured to drive gear 90 by a single fastener hour wheel screw 170.

FIG. 9 also illustrates the nature and operation of pins 24. Pins 24 fit into pin receptacles 124. Detent stops 140 hold pins 24 in the desired position. Left pin 24 in FIG. 9 is illustrated with detent stop 140 located in lower detent 172. The right pin 24 in FIG. 9 is illustrated with detent stop 140 located in upper detent 174. Lower and upper detents 172 and 174 are cylindrical cuts on the surface of pins 24 perpendicular to the axis of pins 24 with sloping sides toward the other detents. Movement of pin 24 shown on the left side of FIG. 9 from lower detent 172 to upper detent 174 is achieved by pushing down on the top of pin 24 forcing the partial collapse of pin 24 into slot 176 which passes through the axis of pin 24. When pin 24 reaches upper detent 174 as illustrated by pin 24 on the right side of FIG. 9, the sides of pin 24 spring back and achieve the position shown.

FIG. 10 is a sectional view along line X—X of FIG. 9. Pin 24 and pin receptacle 124 are cylindrical. Detent stop 140 is located in lower detent 172. Lower detent 172 is parallel to pin slot 176. When pin 24 is moved down, detent stop 140 presses against the right side 178 of pin 24 forcing right side 178 into pin slot 176.

FIG. 11 is a sectional view along line XI—XI of FIG. 7. Second walls 180 define actuator slot 182 of actuator link box retainer portion 184 which is an integrally molded portion of frame means 54. Actuator link 80 passes through actuator slot 182 and is held in position therein.

FIG. 12 is an enlarged and exploded view of a portion of actuator link 80 and day trip lever 84. Both actuator link 80 and day trip lever 84 are unitarily molded plastic parts. Day trip lever 84 has an actuator link axle 186. Actuator link 80 has first walls 188 defining actuator link axle aperture 190. When assembled, actuator link 80 is rotatably mounted on actuator link axle 186. Actuator link axle 186 has a cylindrical bearing surface 191 and an actuator link axle tip retainer member 192 for retaining actuator link 80 on actuator link axle 186. Retainer member 192 comprises two semicircular bearing surface continuation portions 194 and two identical dog portions 196 located 180° from each other.

Actuator link axle aperture 190 has two semicircular interior bearing surfaces 198 and two dog insertion portions 200 having contours which are the reverse of the dog portions 196 on day trip lever 84. The dog portions 196 of day trip lever 84 are located approximately 90 degrees from the dog insertion portions 200 on actuator link 80 when day trip lever 84 and actuator link 80 are in operation. Assembly of actuator link 80 to day trip lever 84 is achieved by rotating the left end of actuator link 80 in FIG. 12 up until dog portions 196 match dog insertion portions 200 and actuator link 80 may be slipped onto day trip lever 84. Actuator link 80 is then rotated down until approximately the position shown in FIG. 12.

Assembly of all components on frame means 54 is extremely easy and fast. From the top side shown in FIG. 2, ilder gear 60 is slipped onto idler gear shaft 62. Pins 24 are then inserted in hour wheel 20 and day wheel 24. Day wheel 22 is placed on day wheel post 156 (FIG. 8) and day wheel screw 58 inserted to secure day wheel 22 and idler gear 60. Finally, washer 164 shown in FIG. 9 is placed on day wheel 20, and day wheel 20 is located in hour timer wheel mounting member 112.

From the back in FIG. 9, drive gear 90 is inserted in hour timer wheel bearing 158. Spring 168 is placed around hour wheel axle 222 and retainer washer 224 and screw 170 installed to secure hour wheel 20.

Electrical timing motor 88 in FIG. 8 is positioned on motor mountings 160 and secured by screws 91.

Switches 70 and 102 in FIG. 3 are positioned in switch mounting members 208 and 226 as described in conjunction with FIG. 4. Hour trip lever 74 is placed on hour trip lever axle 76 and rotated under hour timer wheel mounting member 112. Actuator link 80 is installed on day trip lever 84 as described in connection with FIG. 12 and day trip lever 84 is then placed on day trip lever axle 86 with the left end of actuator link 80 inserted through actuator link box retainer 106. Positioner lever 92 is inserted onto axle 104 and spring 94 installed to bias both positioner lever 92 and day trip lever 84 against day wheel 22. Positioner means 202 is a combination of the molded parts of frame means 54 and special designs of the parts of lever means 72 for retaining actuator link 80 between hour timer means 66, day timer means 68, and switch 70.

Final assembly from the back includes placement of day event lever 96 on axle 98 and attachment of printed circuit board 40 to frame means 54 by three circuit board fasteners 64. Wires (not illustrated) from printed circuit board 40 are then attached to switches 70 and 102. Installation of frame means 54 in cabinet 14 shown in FIG. 1 results in an irrigation controller 10 which is inexpensive, highly reliable, durable, and rapidly assembled.

Having now reviewed the above description and the drawings, those skilled in the art will realize that a wide variety of embodiments may be employed in producing equipment in accordance with the present invention. In many instances, such embodiments may not even resemble that depicted here and may be used for applications other than that shown and described. Nevertheless, such embodiments will employ the spirit and scope of the invention as set forth in the following claims.

I claim:

1. An electromechanical irrigation controller for use with a plurality of electrically activated valves for automatically regulating the time, location, and duration of irrigation comprising, in combination:
    a switching means for sequentially activating said valves having adjustable timing unit means for determining dwell time on each valve;
    an hour timer means for determining the time of day for activating said switching means;
    a day timer means for determining the day for activating said switching means;
    a single switching means activating switch:
    a lever means between said activating switch, said hour timer means, and said day timer means for combining an hour timer means time of day selection and a day timer means day selection to activate said activating switch.

2. The arrangement defined in claim 1 wherein said lever means further comprises:
    an hour trip lever rotating about an hour trip lever axle and moved into an hour trip lver operating position by an hour timer means time of day selection; and
    a day trip lever rotating about a day trip lever axle and moved into a day trip lever operating position by a day timer means day selection.

3. The arrangement defined in claim 2 wherein said lever means further comprises an actuator link for combining an hour trip lever operating position with a day trip lever operating position to activate said switching means.

4. The arrangement defined in claim 2 and further comprising:
    said hour timer means having an hour timer wheel for displaying the time of day and providing hour selection means for activating said switching means;

an hour timer electric motor;

said day timer means having a day timer wheel for displaying the day and providing day selection means for selection of the day for activating said switching means;

frame means for minimizing the number of parts of said electromechanical irrigation controller having:

an hour timer wheel mounting member integrated with said frame means rotatably coupling and retaining said hour timer wheel in said frame means with a single hour timer wheel fastener;

a day timer wheel mounting member integrated with said frame means rotatably coupling and retaining said day timer wheel in said frame means with a single day timer wheel fastener; and said hour timer wheel mounting member having an hour trip lever retainer portion for retaining said hour trip lever in said frame means.

5. The arrangement defined in claim 4 and further comprising:

said lever means having an actuator link for combining an hour trip lever operating position with a day trip lever operating position to activate said switching means;

positioner means for maintaining said actuator link between said hour timer means, said day timer means and said activating switch.

6. The arrangement defined in claim 5 wherein said positioner means comprises:

said day trip lever having an actuator link axle;

said actuator link having first walls defining an actuator link axle aperture and said actuator link rotatably mounted on said actuator link axle;

said actuator link axle having a cylindrical bearing surface and an actuator link axle tip retainer member for retaining said actuator link on said actuator link axle;

said actuator link axle tip retainer member having:

at least one semicircular bearing surface continuation portion; and at least one dog portion extending away from the center of said actuator link axle past the radius of said at least one semicircular bearing surface continuation portion;

said first walls of said actuator link axle aperture having:

at least one semicircular interior bearing surface; and at least one dog insertion portion having a contour the reverse of said at least one dog portion;

said at least one dog portion and said at least one contour the reverse of said at least one dog portion away from an aligned condition for all operating positions of said actuator link and said day trip lever;

said hour trip lever having a knob bearing portion; and an actuator link box retainer portion having second walls defining an actuator slot unitarily formed in said frame means;

whereby said lever means is assembled by fitting said hour trip lever on said hour trip lever axle; said hour trip lever is rotated into engagement with said hour trip lever retainer portion; said day trip lever and said actuator are assembled by aligning said at least one dog portion and said at least one contour the reverse of said at least one dog portion and inserting said actuator link axle into said actuator link axle aperture; said at least one dog portion and said at least one contour the reverse of said at least one dog portion are rotated out of alignment; said day trip lever is fitted on said day trip lever axle; said actuator link is inserted into said actuator slot; and said actuator link is positioned to engage said hour trip lever knob bearing portion.

7. The arrangement defined in claim 6 wherein:

said at least one semicircular bearing surface continuation portion is two semicircular bearing surface continuation portions having identical angles of curvature located 180 degrees from each other on said actuator link axle;

said at least one dog portion is two identical dog portions 180 degrees from each other and between said two semicircular bearing surface continuation portions;

said at least one semicircular interior bearing surface is two semicircular interior bearing surfaces;

said at least one contour the reverse of said at least one dog portion is two contours the reverse of said two dog portions;

whereby said actuator link axle tip retainer member fits through said actuator link axle aperture.

8. The arrangement defined in claim 4 and further comprising:

a day wheel holder lever for holding said day wheel in a given position after being advanced by said hour wheel; and a single day wheel lever spring between said day wheel holder lever and said day trip lever for biasing both of said levers against said day wheel.

9. The arrangement defined in claim 5 and further comprising:

a day wheel holder lever for holding said day wheel in a given position after being advanced by said hour wheel;

a single day wheel lever spring between said day wheel holder lever and said day trip lever for biasing both of said levers against said day wheel;

said activating switch having an activation button returned by a switch spring to a rest position;

whereby said switch spring biases said button to said rest position, said button returning to said rest position biases said actuator link against said hour trip lever causing said hour trip lever to be biased against said day wheel.

10. The arrangement defined in claim 9 wherein said activating switch has:

third walls defining a cylindrical aperture through the body of said activating switch; and an activating switch detent stop on the body surface of said activating switch away from said cylindrical aperture; and further comprising:

a switch mounting member having:

a cylindrical mounting stud for slipping through said cylindrical aperture of said activating switch; and a resilient bracket having a bracket detent;

whereby said activating switch is installed on said cylindrical mounting stud outside of said resilient bracket and said activating switch is then swung under said resilient bracket utilizing said cylindrical mounting stud as an axle until said bracket detent engages said activating switch detent stop to secure said activating switch to said electromechanical irrigation controller.

11. The arrangement defined in claim 7 and further comprising:
a day wheel holder lever for holding said day wheel in a given position after being advanced by said hour wheel;
a single day wheel lever spring between said day wheel holder lever and said day trip lever for biasing both of said levers against said day wheel;
said activating switch having an activation button returned by a switch spring to a rest position;
whereby said switch spring biases said button to said rest position, said button returning to said rest position biases said actuator link against said hour trip lever causing said hour trip lever to be biased against said day wheel.

12. The arrangement defined in claim 11 wherein said activating switch has:
third walls defining a cylindrical aperture through the body of the said activating switch; and
an activating switch detent stop on the body surface of said activating switch away from said cylindrical aperture; and further comprising:
a switch mounting member having:
a cylindrical mounting stud for slipping through said cylindrical aperture of said activating switch; and
a resilient bracket having a bracket detent;
whereby said activating switch is installed on said cylindrical mounting stud outside of said resilient bracket and said activating switch is then swung under said resilient bracket utilizing said cylindrical mounting stud as an axle until said bracket detent engages said activating switch detent stop to secure said activating switch to said electromechanical irrigation controller.

13. An electromechanical irrigation controller for use with a plurality of electrically activated valves for automatically regulating the time, location, and duration of irrigation comprising, in combination:
a switching means for sequentially activating said valves having adjustable timing unit means for determining dwell time on each valve;
an hour timer means for determining the time of day for activating said switching means;
a day timer means for determining the day for activating said switching means;
at least one switching means activating switch;
said activating switch having:
third walls defining a cylindrical aperture through the body of said activating switch; and
an activating switch detent stop on the body surface of said activating switch away from said cylindrical aperture; and
a switch mounting member having:
a cylindrical mounting stud for slipping through said cylindrical aperture of said activating switch; and
a resilient bracket having a bracket detent;
whereby said activating switch is installed on said cylindrical mounting stud outside of said resilient bracket and said activating switch outside of said resilient bracket and said activating switch is then swung under said resilient bracket utilizing said cylindrical mounting stud as an axle until said bracket detent engages said activating switch detent stop to secure said activating switch to said electromechanical irrigation controller.

* * * * *